United States Patent [19]

Horton

[11] 4,373,058

[45] Feb. 8, 1983

[54] POLYMER CONCRETE COMPRISING FURFURYL ALCOHOL RESIN

[75] Inventor: Lowell C. Horton, Pensacola Beach, Fla.

[73] Assignee: Joe G. Hosner, Pensacola, Fla.

[21] Appl. No.: 244,811

[22] Filed: Mar. 17, 1981

[51] Int. Cl.[3] .......................... C08L 95/00; C08K 3/36; C08K 3/34

[52] U.S. Cl. .......................... 524/705; 524/189; 524/847; 524/853

[58] Field of Search .......................... 260/42.53; 524/705, 524/789, 847, 853

[56] References Cited

U.S. PATENT DOCUMENTS

| | | | |
|---|---|---|---|
| 3,024,215 | 3/1962 | Freeman et al. | 260/42.53 |
| 3,487,043 | 12/1969 | Grudus | 260/42.53 |
| 3,529,053 | 9/1970 | Smith et al. | 260/42.49 |
| 3,700,604 | 10/1972 | Metil | 525/326 |
| 3,738,955 | 6/1973 | Bozer et al. | 260/37 R |
| 3,888,816 | 6/1975 | Brown et al. | 260/39 R |
| 4,033,925 | 7/1977 | Anderson | 260/42.53 |

FOREIGN PATENT DOCUMENTS

| | | |
|---|---|---|
| 964784 | 3/1975 | Canada . |
| 1542422 | 10/1968 | France . |

OTHER PUBLICATIONS

Derwent Abst. 32594T/21, (5-10-72), DT 2053482, "Slow Setting Acid Resistant Bldg. Mat Contg. Furfuryl Resin".

Derwent Abst. 57063Y/32, (2-11-77), SU530868, "Polymer Concrete Mix for Road Surface . . . ", (RORE).

Derwent Abst. 90655B/50, (3-30-79), SU654569, (ANDR), "Mixt. for Mfr. of Wood-Stone Articles . . . . Furfuryl Alcohol".

Derwent Abst. 62996X/33, (2-4-76), SU491597, (IRTU), "Polymeric Concrete . . . . ".

*Primary Examiner*—Paul Lieberman

*Assistant Examiner*—Herbert J. Lilling

*Attorney, Agent, or Firm*—Harvey B. Jacobson

[57] ABSTRACT

A polymer concrete comprising by weight about 40-70% coarse aggregate, about 20-55% of a fine aggregate such as sand, about 2-15% silica flour and about 8% to 12% furfuryl alcohol polymerized in situ with an acid catalyst produces a highly cross-linked concrete which contains no cement and is mixed with water. The furfuryl polymer concrete provides the broadest range of chemical resistance of all existing polymer concretes. The coarse and fine aggregate have a pH less than 7.0 and are provided with a specific size gradation.

10 Claims, No Drawings

POLYMER CONCRETE COMPRISING FURFURYL ALCOHOL RESIN

BACKGROUND OF THE INVENTION

Field of the Invention

This invention relates to an improved concrete, and in particular to what can be characterized by a polymer concrete in which a monomer polymerized in situ is used as the binder component for the concrete aggregate instead of conventional hydraulic binders which require the addition of water to set.

More specifically, the present invention relates to a polymer concrete free of water in which the polymeric binder comprises furfuryl alcohol monomer polymerized in situ with the aid of an acid catalyst.

Generally, a significant proportion of concrete used today in pavements, structural supports for buildings and machinery and other widely known uses is formed from a mixture of fine and coarse mineral aggregates and a paste of Portland cement and water. Such Portland cement formulations comprise from about 60% to 75% aggregates and from about 25% to 40% paste by volume of the formulation. The quality of Portland cement concrete depends on many factors including the type of aggregate used and gradation of the aggregate size as well as the quality and availability of the paste and the amount and quality of the water relative to the amount of Portland cement added.

Studies and tests have been performed on polymeric additives to concrete and polymeric materials used as substitutes for the typical hydraulic cement binder materials. For example, polymer cement concrete which is a mixture of conventional hydraulic cement concrete and high molecular weight polymers has been formed comprising generally thermoplastic or rubber polymers which are added as emulsions or dispersions to the hydraulic concrete mix. Polymers which have been utilized in such systems include polyvinylacetate, polyacrylates, polyvinylchloride, styrene-butadiene and polyvinylidenechloride. Copolymers of two or more of the polymers have also been utilized. While improvements in the physical properties such as compressive strength, bending strength and decreased water permeability have been reported in the literature for these polymer cement concretes, these improvements have been offset by significant dimensional shrinkage. It has been found that the wear-resistance of polymer cement concretes is significantly better than Portland cement concrete and thus, polymer cement concretes have found some use as floor and deck coverings in public buildings, industrial plants and bridges.

Over the last fifteen years, extensive laboratory studies have been performed in the United States on both polymer-impregnated concrete and polymer concrete in which the hydraulic binder is totally substituted with a polymeric material. Such studies have primarily focused on solving problems on failing concrete bridge decks and on concrete pipe in corrosive waste water environments. Polymer-impregnated concrete consists of polymer-impregnation of Portland cement concrete with a low viscosity monomer that is subsequently polymerized in situ. The monomer penetrates the concrete matrix to a finite depth (sometimes controlled) and is subsequently polymerized by heat, catalysts, or radiation. Significant property improvements in compressive strength (285%) tensile strength (292%), modulus of elasticity (80%), freeze-thaw durability (300%) and water permeability have been reported by U.S. Department of Interior/Bureau of Reclamation, W. C. Cowan & H. C. Riffle *Investigation of Polymer-Impregnated Concrete Pipe,* September, 1974. Data on the resistance of polymer-impregnated concrete to mild hydrochloric and sulfuric acids and permeation by chloride was presented by the Brookhaven National Laboratory in 1976, L. E. KuKacka and M. Steinberg *Concrete-Polymer Composites, A Material For Use In Corrosive Environments,* March, 1976.

Polymer concrete differs from typical Portland cement concrete, polymer cement concrete and polymer-impregnated concrete. Polymer concrete contains no cement or water. The development of physical and chemical properties of polymer concrete depends entirely on the chemical and slightly physical reaction between the polymeric binder, hardener and the aggregate system. Most of the early experimentation on polymer concrete has occurred in Eastern Europe and the Soviet Union. More recent experimentation in the United States has focused on bridge deck and highway repairs and experimental attempted use of a polymer concrete lining for steel pipe in geothermal applications. Few commercial applications of polymer concrete are known, but experimental use of polymer concrete materials has been ongoing since about 1960. For example, in bridge deck and geothermal applications, polymer concrete systems containing methylmethacrylate and blends of polyester/styrene have been evaluated and their properties have been measured and reported by G. W. DePuy, L. E. KuKacka, *Concrete-Polymer Materials, Fifth Topical Report,* Brookhaven National Laboratory, December, 1973. Significant improvements in compressive strength (18–20,000 PSI) water absorption (less than 1%) and chemical resistance are obtained versus conventional Portland cement concretes. However, for applications in heavy industrial environments, even more chemically resistant polymer concretes are needed.

The present invention provides a polymer concrete with improved physical properties over conventional Portland cement concretes and which can be used for a wide variety of uses such as coatings, coverings, repairs and for applications in heavy industrial environments in which strength, flexibility and chemical resistance are required. It has been found that furan resins, particularly those formed from furfuryl alcohol monomers can be mixed with a novel aggregate system to yield polymer concretes of improved chemical and physical characteristics. Furan polymers have found wide use in the formation of foundry cores in which small-sized aggregates (sand) are mixed therewith, all large-sized aggregates being excluded from such formulations. Likewise, there have been studies performed on polymer concrete systems including polymer concrete systems utilizing furan polymers in the United States, such as by the U.S. Atomic Energy Commission, Oak Ridge National Laboratory, Oak Ridge, Tenn., *Translation Series AEC*-tr-7147, November, 1971, and further testing on furan polymer concretes in the Soviet Union in which it was found that the performance of polymer concretes are significantly influenced by aggregate selection to produce furan polymer concretes with a range of compressive strengths varying from 5000 to 15,000 PSI; I. M. Elshin, Scientific Research Institute of Hydrotechnics, Kiev, U.S.S.R., "Experience in Using Plastic Concrete with Furan Resins in Different Structures". Likewise, Sneck, Tenho, Marttiner, Pertti, Eneback, and Carl, The State Institute for Technical Research, Otamiemi, Finland, *A Preliminary Investigation on the Properties of Some Fufural Acetone Resin Mortars,* have tested various physical properties of furan polymer concretes as has The Quaker Oats Company, Chemical Division, Chicago, Ill.

SUMMARY OF THE INVENTION

In accordance with the present invention, an improved polymer concrete is provided in which a resin binder of polymerized furfuryl alcohol is formed in situ within a novel aggregate system.

Briefly, the polymer concrete of the present invention comprises about 40 to about 70% by weight coarse aggregate, about 20 to about 55% by weight fine aggregate (sand), about 2 to about 15% silica flour and about 8 to about 12% furan resin formed by the in situ polymerization of furfuryl alcohol with aid of an acid catalyst. It has been found that by varying the aggregate formulation within the disclosed range, furan polymer concretes can be produced with compressive strengths varying from 5000 to 15,000 PSI, flexural strengths of 2500 to 5400 PSI and tensile strengths of about 2000 PSI. Porosity can be controlled by varying the aggregate gradation, binder level and curing temperature.

In accordance with the teachings of the present invention, certain factors have been recognized which are critical if a viable furfuryl alcohol polymer concrete is to be produced. Accordingly, it has been found that aggregate sources and types of aggregates are critical to achieve proper curing and high strength. In particular, aggregate size gradations as well as the pH of the aggregate components must fall within the range set forth in the present invention. Moisture content is very critical and must be minimized. Relatively high moisture content retards cure and greatly reduces strength of the furan polymer concrete. Control of the polymerization reaction is important especially when large batches of the concrete product are made to allow for uniform mixing and ease of pouring.

The furan polymer concretes of the present invention when cured produce a highly cross-linked resinous concrete in which the aggregate materials are dispersed within the resin binder. The furan polymer concretes of the present invention offer the broadest range of chemical resistance over all other types of polymer concretes which are based upon different polymer systems or based on furan polymer systems of different aggregate types.

Accordingly, it is an object of the present invention to provide an improved concrete.

In accordance with the aforementioned object, another object of the present invention is to provide a polymer concrete in which a furan polymer is utilized as the binder for the concrete aggregate system, replacing typical hydraulic cement and water binder systems.

Another object of the present invention is to provide a polymer concrete devoid of water and which is formed from the in situ polymerization of furfuryl alcohol monomer mixed with an aggregate system to provide a concrete product which can be used successfully for a wide variety of purposes.

Still another object of the present invention is to provide an improved furan polymer concrete which comprises the in situ polymerization product of furfuryl alcohol monomer mixed with an aggregate system comprising coarse and fine aggregates of controlled size gradation to yield a concrete product usable for a wide variety of purposes.

These together with other objects and advantages which will become subsequent apparent reside in the details of the composition and method of making some as more fully herein after described and claimed.

DETAILED DESCRIPTION OF THE INVENTION

Specifically, the polymer concrete of the present invention is formed from a blend of furfuryl alcohol monomer and an acidic hardener mixed with a mineral aggregate system. The furfuryl alcohol monomer is polymerized in situ within the mixture to produce a highly cross-linked resinous polymer concrete in which the mineral aggregates are dispersed or bound within the polymer binder.

Polymer concretes formed from furan polymers offer the broadest range of chemical resistance reported and are further advantageous for producing a usable concrete product because of the relatively low viscosity, ease of handling, mixing, consolidation, flow and finish, rapid cure at ambient temperatures of such concretes and because of the advantageous raw material availability and cost performance relative to other organic binders which have been utilized in polymer concretes. The chemical resistance of various polymer concretes are presented in TABLE 1.

TABLE 1*

RELATIVE CHEMICAL RESISTANCE OF POLYMER CONCRETE AND PORTLAND CEMENT CONCRETE
Rated 1 (Poorest) to 10 (Best)

| Material | To Acids | To Oxidizers | To Alkali | To Salts | To Solvents | To Fats and Petroleum Products |
|---|---|---|---|---|---|---|
| Phenol PC | 9-10 | 3-4 | 3-4 | 10 | 7 | 8 |
| Furan PC | 10 | 2-3 | 10 | 10 | 8 | 8 |
| Polyester PC | 8-9 | 7 | 3-4 | 3-5 | 1-5 | 7-9 |
| Epoxy PC | 9 | 3 | 8 | 5-6 | 3-7 | 9 |
| Portland Cement Concrete | 1 | 1 | 9 | 2-3 | 3-7 | 5-6 |

*Taken from Translation Series AEC-tr-7147, November, 1971, U.S. Atomic Energy Commission, Oak Ridge National Laboratory, Oak Ridge, Tennessee.

Furfuryl alcohol monomer cures in the presence of most inorganic, organic and latent acid hardeners, such as phosphoric acid, sulfuric acid, urea nitrate, benzene sulfonic acid, and toluene sulfonic acid. Selection of an optimum catalyst system, whether solid or liquid, depends on many factors including the field conditions in which the polymer concrete is to be used. Such field conditions as temperature, humidity and batch size of the polymer concrete must be considered since all of these condition will be a factor in which catalyst system is utilized.

Further, the performance of furan polymer concrete is significantly influenced by aggregate selection including type and size gradation. Many fine and coarse aggregate types are available and can be chosen to produce furan polymer concretes with a range of compressive strengths varying from 5000 to 15,000 PSI. It has been found that the size gradation of both the coarse and fine aggregates used in polymer concrete mixture not only affect the compressive strengths of the polymer concrete but greatly influence the ability to form a uniform concrete mixture, ease of handling and chemical resistance properties of the formed polymer concrete. Furthermore, aggregates containing base substances such as carbonates, limestone, sandstone and clay are undesirable because these impurities neutralize the hardener (acid catalyst) and as such optimum property development will not occur. Accordingly, the aggregate must have a pH less than 7 in order to produce a concrete product which can be used successfully in the field.

The polymerization rate and the final properties of furan polymer concrete are also greatly influenced by the amount of moisture in the aggregate. Published data has shown that when containing as little as 5% to 6% moisture in the aggregate, the furan polymer concrete develops very low compressive strength, and at higher moisture contents, the material will not harden. Accordingly, to produce a high quality furan polymer concrete, the aggregate which is selected must have the proper sizing, be clean and free of any alkaline impurities, and have a moisture content preferably below 1%.

Initial laboratory work on furan polymer concretes focused on characterizing and optimizing the chemical property development, binder levels, handling properties and chemical resistance. In performing this work, three aggregates and a 65% toluene sulfonic acid hardener in water were used. Various binder and hardener levels and curing temperatures were evaluated. To produce laboratory test specimens, the components were mixed according to the following procedures:

The dried aggregates were blended for 3 minutes, using a small motor mixer, while the hardener was slowly added to the aggregate. In some cases it was necessary to further dilute the hardener with solvent to insure uniform distribution. Careful attention was given to measuring the hardener, since concentration influenced polymerization rate and mechanical properties. Excess hardener led to nearly instantaneous setting of the mix and poor physical properties. The binder was added to the hardener/aggregate blend and mixed for 5 minutes. The mixed furan polymer concrete was placed in 1-inch diameter by 2-inch high compression molds and allowed to cure at room temperature for fourteen days. Data on resulting mechanical properties versus type-1 Portland cement concrete are shown in TABLE 2.

TABLE 2

MECHANICAL PROPERTIES OF FURAN PC MIXES CURED 14 DAYS VS. TYPE 1 PORTLAND CEMENT CONCRETE CURED 28 DAYS

| | Furan PC Mix (Wt. %) | | | Type 1 Portland Cement Concrete | |
|---|---|---|---|---|---|
| Component | Mix A | Mix B | Mix C | 5.5 Bag Mix | 7 Bag Mix |
| #8 Quartz | 43.5 | 44.2 | 49.2 | | |
| #50 Quartz | 17.4 | 17.7 | 22.5 | | |
| Silica Flour | 26.1 | 26.6 | 18.3 | | |
| FA Binder | 11.8 | 10.5 | 9.1 | | |
| 65% TSA Hardener | 1.2 | 1.0 | 0.9 | | |
| Total | 100.0 | 100.00 | 100.00 | | |
| Compressive Strength (psi) | | | | | |
| ASTM C579 | 6,370 | 6,660 | 5,030 | | |
| ASTM C39 | | | | 3.000 | 4,500 |
| Flexural Strength (psi) | | | | | |
| ASTM C580 | 2,880 | 2,680 | 3,310 | | |
| ASTM C78 | | | | 500 | 750 |
| Tensile Strength (psi) | | | | | |
| ASTM C307 | 1,470 | 1,550 | 1,250 | | |
| Porosity (Vol. %) | 0.35 | 0.17 | 0.09 | | |

The same mixing procedures were followed to obtain specimens for elevated temperature curing. After curing for 14 days at room temperature, the specimens were post cured for 1 hours at 200° F. and an additional 2 hours at 250° F. The affect of post cure on physical property development is shown in TABLE 3. As can be seen from the TABLE, higher strengths and greater porosity resulted from post curing. For most applications, minimum porosity is desirable.

TABLE 3

MECHANICAL PROPERTIES OF FURAN PC POST CURED AT ELEVATED TEMPERATURES

| Test | Mix A | Mix B | Mix C |
|---|---|---|---|
| Compressive Strength (PSI) (ASTM C579) | 10,740 | 11,390 | 12,750 |
| Flexural Strength (PSI) (ASTM C580) | 2,550 | 5,400 | 5.400 |
| Tensile Strength (PSI) (ASTM C307) | 1,980 | 2,070 | 2,000 |
| Porosity (Vol. %) | 1.12 | .42 | .38 |

Published information has further characterized the mechanical properties of furan polymer concretes. Such published studies have illustrated the compressive strength development of furan polymer concrete as a function of time at 20° C. and 73° relative humidity using a 14% binder/hardener level. It has been found that at those defined conditions, approximately 28 days are needed to develop maximum compressive strength properties. However, approximately 79% of ultimate strength is developed within 7 days and 95% within 14 days. Another published study has characterized the compressive strength development of furan polymer concrete as a function of relative humidities. The specimens contained in an 11% binder level and strengths were determined after exposure to different relative humidities for 28 days at 20° C. This study found that a significant sacrifice in compressive strength results when the samples are mixed and cured at high relative humidities. Another study has shown the change of length (shrinkage) of furan polymer concrete with time. In the published studies, various specimens were measured at 20° C. and 73% relative humidity. The shrinkage measurements started after 24 hours cure and continued through 28 days. The data reveal a low level of shrinkage (less than 0.72%) occurs, most during the first 7 days of ambient cure.

Laboratory chemical resistance tests were conducted by totally immersing the post cured compession cylinders formed by the procedures set forth above in selected reagents at 150° F. for various times. Changes in compressive strength, weight, and color were observed. The 6-month data are presented in TABLE 4. With the exception of immersion in 5% sodium hydroxide, which attack the aggregate, furan polymer concrete exhibited excellent resistance to the reagents. The reagent color changes may indicate only surface attack of furan polymer concrete specimens.

TABLE 4

SIX MONTH CHEMICAL RESISTANCE OF FURAN PC IN IMMERSION

| Reagent | % Compressive Strength Retention | % Weight Change | Reagent Color at Six Months |
|---|---|---|---|
| Deionized Water | 92 | +.70 | Clear |
| Saturated Sodium Chloride | 105 | +.16 | Clear |
| 5% Sodium Hydroxide | 49 | −5.46 | Black |
| 15% Hydrochloric Acid | 100 | +.13 | Orange |
| Methyl Ethyl Ketone | 98 | +.17 | Black |
| Perchloroethylene | 100 | −.64 | Green |
| Chlorobenzene | 108 | −.54 | Yellow |

Further scale-up trials have been conducted to focus on aggregate optimization, large scale handling properties and improved physical properties. Crushed granite stone conforming to ASTM D-448 seive specifications and silica sand conforming to ASTM C-33 were blended in various size ratios. Moisture contents of the blends varied and were not part of the tests. Basic concrete mix design and concrete test procedures were utilized. Compressive strength tests were used as the strength criteria. Concrete test cylinder molds 6 inches in diameter×12 inches high were filled from a 30-pound batch, prepared with a small mortar mixture. The mix procedure used for the laboratory tests was duplicated for these scaled trials. Various blends combining aggregates with different particle sized distributions, different binder levels and hardener levels were investigated. The mixing was performed at 50°–60° F. and relative humidities varying from 40–70%. As the ingredients were placed in the concrete test cylinder molds, they were rodded and lightly screeded to remove excess mix. No external vibration was used for consolidation. Tests with the addition of glass reinforcement to the batch proved difficult to mix, pour and finish, and did not improve physical property development.

TABLE 5 summarizes some typical findings of the scale-up tests. With the exception of mix #1, the binder content of the mix is shown as constant, so that the effect of aggregate size distribution on strength development, handling and finished characteristics may be compared.

TABLE 5

STRENGTH DEVELOPMENT OF FURAN PC VERSUS AGGREGATE

| Sieve Size | Size Opening (Inches) | Mix Number 1 | 2 | 3 | 4 | 5 |
|---|---|---|---|---|---|---|
| | | (Wt. Percent Aggregate Retained) | | | | |
| ½" | .530 | 23.4 | — | 32.9 | — | 32.9 |
| ⅜" | .375 | 14.7 | 0.4 | 20.5 | 0.4 | 20.6 |
| No. 4 | .187 | 11.0 | 25.8 | 2.5 | 25.8 | 2.5 |
| No. 8 | .0937 | 7.6 | 20.1 | 0.8 | 19.6 | 0.3 |
| No. 16 | .0469 | 6.2 | 10.4 | 5.4 | 11.4 | 6.4 |
| No. 30 | .0232 | 9.5 | 14.1 | 10.0 | 22.4 | 18.3 |
| No. 50 | .0117 | 9.3 | 12.1 | 11.0 | 10.6 | 9.4 |
| No. 100 | .0059 | 6.8 | 8.5 | 8.3 | 2.5 | 2.3 |
| Less than No. 100 | | 11.5 | 8.6 | 8.6 | 7.3 | 7.3 |
| | TOTAL | 100.0 | 100.00 | 100.0 | 100.00 | 100.00 |
| Binder Level (Wt. % of total mix) | | 6 | 8 | 8 | 8 | 8 |
| Hardener (wt. % of binder) | | 12 | 20 | | | |
| Cure Conditions | | R.T. 7 days @ R.T./5 Hrs. @ 120° F. | R.T. 1 Day @ R.T./2 Hrs. @ 250° F. | | | |
| Compressive Strength (psi) (ASTM C-39) | | 7,145 | 8,500 | 8,850 | 5,700 | 7,700 |
| Comments | | Easy to work. Poor finish. Set up time 40 minutes. Good consolidation. | Excellent flow/finish. Set up time 15 minutes. Good Consolidation. | Good flow. Some difficulty Temp. Good finish | Fair flow; affected by coarse sand. Reasonable appearance. Fair smoothness. | Appearance smooth. Finish fair. |

From field tests in which the furan polymer concrete was installed as a pump base in a chemical plant, the following factors were found:

(1) Aggregate sources and types are critical to achieve proper cure and high strengths in furan polymer concretes.

(2) Moisture content is critical to set time and strength of furan polymer concretes. Aggregates must be pre-dried in order to achieve consistent results.

(3) Safety is a critical concern. The hardener needs to be preblended with the aggregate in order to safely control the reaction time with the furfuryl alcohol monomer binder.

(4) To achieve a suitable working time and good finishing, the proportion of liquids in the batch must be in the proper range. To effect economy this may mean adding some non-reactive dilutants to the batch.

(5) Control of the exothermic reaction is critical to minimize shrinkage and permit good consolidation and finishing.

(6) To scale-up for pouring major structures with furan polymer concrete, a system of automated field batching equipment appears to be necessary. Control of environmental factors such as rain, humidity and temperature would be certainly critical.

(7) Good adhesion of furan polymer concrete to Portland cement concrete and to steel reinforcing can be achieved with the proper priming system.

In accordance with the present invention, a furan polymer concrete containing the following ingredients and proportions thereof has been found to produce satisfactory results and can be used successfully in the numerous known concrete applications:

| | |
|---|---|
| Coarse aggregate | 40–70% by weight |
| Fine aggregate (sand) | 20–55% by weight |
| Silica flour | 2–15% by weight |
| Furfuryl alcohol resin | 8–12% by weight |

An amino silane coupling agent may be added in minor amounts. Further, the acid catalyst is added in amounts ranging from about 8% to about 12% of the total weight of the polymerized resin. A more preferred range of ingredients is as follows:

| | |
|---|---|
| Coarse aggregate | 45–60% by weight |
| Fine aggregate | 30–40% by weight |
| Silica flour | 2–10% by weight |
| Resin | 8–12% by weight |

More specifically, the following combination of components yields an excellent polymer concrete:

| | |
|---|---|
| Coarse aggregate | 54% by weight |
| Fine aggregate (sand) | 36% by weight |
| Silica flour | 10% by weight |
| Total | 100% |

Further, the furfuryl alcohol monomer is added in amounts of about 8–10% of the total batch weight, depending upon compressive strengths required, the more resin, the greater the compressive strengths. The preferred acid catalyst is toluene sulfuric acid added as a 65% in water solution in amounts of about 8% to about 12% of the total resin weight.

The procedure for forming the polymer concrete of the present invention is as follows:

(1) mix sand, coarse aggregate and silica flour thoroughly in an electric mixer such as of the rotary type for several minutes to insure complete blending, using batches of not more than 150 pounds at a time; (2) add to the blended mix the acid catalyst in the correct proportions and mix thoroughly for several minutes (2–4 minutes); (3) slowly add, while the mixer is still rotating, the furfuryl alcohol monomer in the proportion shown above; and (4) after mixing for about 2–4 minutes, pour into the form, screed off and allowed to cure.

The function of each of the ingredients added to the polymer concrete of the present invention can be characterized. The fine and coarse aggregates serve as fillers and compression strength contributors after the monomer has polymerized and the polymerized resin has hardened. The silica flour serves to give a smooth finish on sides, top and bottom, filling voids left by the fine aggregate. The polymerized furan resin, of course, serves as the binder for the aggregates and silica flour, holding the strength-giving mineral aggregates together as a monolithic structure. The catalyst serves to polymerize the furfuryl alcohol monomer to form a solid binder. Other agents may be added such as coupling agents to enhance the adherence of the resin binder to the mineral aggregates. Pigments as well as other materials may be added to control reaction time, ease of handling, flow, etc. so long as such materials do not adversely affect the strength of the formed polymer concrete.

Catalysts other than the 65% toluene sulfonic acid solution can be used in the formulation of the polymer concrete so that the "set time" or "field work time" can be extended. Such catalysts include more dilute solutions of toluene sulfonic acid (35–45%); phosphoric acid; combinations of toluene sulfonic acid and phosphoric acid; and zinc chloride in water (5% zinc chloride solution). If zinc chloride or other latent catalysts are used, the concrete mix must be heated to temperatures of about 140° F. to 180° F. to insure a proper and adequate cure.

Coarse aggregate which can be used in the polymer concrete of the present invention can consist of gravel, stone or slag. All coarse aggregates must be washed and dried to a moisture content of less than 1% and preferably no more than one-half of 1% moisture. The coarse aggregate must be free from disintegrated pieces, salt, alkali, carbonates, vegetable matter and adherent coatings. The weight of extraneous substances must not exceed the following percentages:

| | |
|---|---|
| Coal and lignite | 1.00 |
| Coal lumps | 0.05 |
| Soft fragments | 10.00 |
| Cinders and clinkers | 0.50 |
| Free shells | 1.00 |
| Material passing No. 200 Sieve | 1.75 |

In addition, the sum of the percentages of all of the substances above shall not excess 10%. Gravel used in the formulation of the polymer concrete must be composed of clean, tough, durable quartz. Loss when the material is subjected to the Los Angeles abrasion test should not be more than 50%. The dry-rodded weight per cubic foot of the gravel should not be less than 95 pounds. The PH must be 7.0 or less. Stone used in the formulation of the polymer concrete should be clean, durable rock. The loss, when subjected to the Los Angeles abrasion test should not exceed more than 45%. The dry-rodded weight should not be less than 95 pounds per cubic foot and the pH must be 7.0 or less. Slag used must be clean, tough and durable. It must be air-cooled blast-furnace slag only. It should be reasonably uniform in density and quality, and free from deleterious substances and contain not more than 1.5% sulfur. The dry-rodded weight should not be less than 70 pounds per cubic foot, and the loss, when subjected to the Los Angeles abrasion test should not exceed 45%. The pH again must not be greater than 7.0. Coarse aggregates of different types cannot be mixed, nor used alternately in sections adjacent to each other or considered part of "one pour".

TABLE 6 below indicates a coarse aggregate gradation. As can be seen from the TABLE, most of the coarse aggregate falls in the range of about 1 inch to no less than #4 ASTM sieve size (0.187 inch). Preferably, most of the aggregrate is equal to or less than ⅜ inch and not less than 0.187 inch. Preferably, 90% of the coarse aggregate should be in the range of one-half inch to 0.187 inch.

TABLE 6

| | COARSE AGGREGATE - GRADATION Percent by Weight of Coarse Aggregate Passing Square-Opening Laboratory Sieves | | | | | | | | | |
|---|---|---|---|---|---|---|---|---|---|---|
| GRADE | 3 in. | 2 in. | 1½ in | 1 in. | ¾ in. | ½ in. | ⅜ in. | No. 4 | No. 8 | No. 10 | No. 16 |
| 3M | 100 | 97–100 | 75–100 | 40–75 | | 15–35 | | 0–5 | | | |
| 5 | | 100 | 95–100 | 85–100 | 60–90 | 30–60 | | 0–10 | | | |
| 7 | | | | | 100 | 90–100 | 40–70 | 0–15 | | | |
| 9 | | | 100 | 95–100 | 75–100 | 35–70 | 5–30 | 0–10 | | | |
| 11 | | | | 95–100 | | 0–30 | 0–9 | | | | |
| 12 | | | | 100 | 90–100 | 30–65 | 0–15 | | | | |
| 14 | | | | | 100 | 85–100 | 40–75 | 0–15 | | | |
| 15 | | | | | 100 | 90–100 | | 0–10 | | 0–2 | |
| 16S | | | | | 100 | 90–100 | 70–90 | 30–50 | | 0–8 | 0–5 |
| 89 | | | | | | 100 | 90–100 | 20–55 | 0–30 | | |

The combination of fine aggregates used in the formulation of the of the polymer concrete of the present invention should consist of sand composed of hard, strong, durable uncoated grains of quartz, either quarry pit material or material dredged from river bottoms. All fine aggregates should be completely free from lumps, clay, soft or flakey particles, salt, alkali, organic matter, loam or extraneous substances. Moisture content should be no more than one-half of 1% and the pH must be 7.0 or less. The fine aggregates should be well graded, from coarse to fine, and when tested by means of laboratory sieves meet the following requirement, in percent of total weight:

| Total Retained On: SIEVE NO. | PERCENT |
|---|---|
| 4 | 0–5 |
| 8 | 0–15 |
| 16 | 3–35 |
| 30 | 30–75 |
| 50 | 65–95 |
| 100 | 93–100 |

No. 200-140 mesh silica flour used in the formulation of the polymer concrete preferably is of commercial grade, dry, bagged silica flour free of carbonates.

Preferably, at least 75% of the fine aggregate has a size range from about 0.047 inch to about 0.006 inch.

The foregoing is considered as illustrative only of the principles of the invention. Further, since numerous modifications and changes will readily occur to those skilled in the art, it is not desired to limit the invention to the exact composition and operation shown and described, and accordingly, all suitable modifications and equivalents may be resorted to, falling within the scope of the invention.

What is claimed as new is as follows:

1. A polymer concrete composition comprising by weight about 40% to about 70% coarse mineral aggregate ranging in size from about 1½ inches to about 0.187 inch, about 20% to 55% fine mineral aggregate ranging from about 0.187 inch to about 0.0059 inch; about 2% to about 15% silica flour; about 8% to about 12% furfuryl alcohol monomer polymerized in situ by the addition of an acid catalyst contained in amounts of about 8% to about 12% by weight of said monomer, said mineral aggregates having a pH less than about 7.0, and the moisture content of the mineral aggregates being less than about 1% by weight.

2. The polymer concrete of claim 1 wherein the moisture content of the mineral aggregates is less than 0.5% by weight of said mineral component.

3. The polymer concrete of claim 1 wherein the amount of extraneous substances must not exceed 10% by weight of said concrete.

4. The polymer concrete of claim 1 wherein said coarse aggregate is provided in amounts of about 45% to about 60% by weight; said fine aggregate in amounts of about 30% to about 40% by weight; said silica flour in amounts of about 2% to about 10% by weight.

5. The polymer concrete of claim 4 wherein at least 90% of said coarse aggregate ranges from about one-half inch to about 0.187 inch.

6. The polymer concrete of claim 5 wherein at least 75% of said fine aggregate has a size range from about 0.047 inch to about 0.006 inch.

7. The polymer concrete of claim 6 wherein said mineral component comprises 54% by weight of said coarse aggregate, about 36% by weight of said fine aggregate and about 10% by weight of silica flour.

8. A polymer concrete composition comprising a furfuryl alcohol monomer polymerized in situ and a mineral aggregate mixture, said mineral aggregate comprising 40% to 70% of a coarse aggregate greater than about 0.187 inch and about 20% to 55% of a fine aggregate less than 0.187 inch, said aggregate having a moisture content of 1% or less by weight and a pH of less than 7.0.

9. The polymer concrete of claim 1 wherein the concrete contains by weight percent less than 1.00 of coal and lignite, 0.05 of coal lumps, 10.00 of soft fragments, 0.50 of cinders and clinkers, 1.00 of free shells, and 1.75 of material passing a No. 200 sieve.

10. The polymer concrete of claim 1 wherein the concrete is free of salt, alkali, carbonates, and vegetable matter.

* * * * *

REEXAMINATION CERTIFICATE (633rd)

United States Patent [19]

[11] B1 4,373,058

Horton

[45] Certificate Issued Feb. 10, 1987

[54] POLYMER CONCRETE COMPRISING FURFURYL ALCOHOL RESIN

[75] Inventor: Lowell C. Horton, Pensacola Beach, Fla.

[73] Assignee: The Horton Co.

Reexamination Reqs:st:

No. 90/000,422, Jul. 18, 1983

No. 90/000,803, Jun. 17, 1985

Reexamination Certificate for:

| | |
|---|---|
| Patent No.: | **4,373,058** |
| Issued: | **Feb. 8, 1983** |
| Appl. No.: | **244,811** |
| Filed: | **Mar. 17, 1981** |

[51] Int. Cl.[4] ........................ C08L 71/06; C08K 3/34; C08K 3/36

[52] U.S. Cl. .................................... 524/705; 524/789; 524/847; 524/853

[58] Field of Search ................ 524/705, 789, 847, 853

[56] References Cited

U.S. PATENT DOCUMENTS

| | | | |
|---|---|---|---|
| 3,024,215 | 3/1962 | Freeman et al. | 260/42.53 |
| 3,280,232 | 10/1966 | Lander | 264/71 |
| 3,301,278 | 1/1967 | Lander | 138/145 |
| 3,409,582 | 11/1968 | Brown | 523/144 |
| 3,487,043 | 12/1969 | Grudus | 260/42.53 |
| 3,529,053 | 9/1970 | Smith et al. | 260/42.49 |
| 3,644,274 | 2/1972 | Majrukas | 523/144 |
| 3,681,287 | 8/1972 | Brown | 528/249 |
| 3,700,604 | 10/1972 | Metil | 525/326 |
| 3,738,955 | 6/1973 | Bozer et al. | 260/37 R |
| 3,745,139 | 7/1973 | Kachur | 523/139 |
| 3,888,816 | 6/1975 | Brown et al. | 260/39 R |
| 4,033,925 | 7/1977 | Anderson | 260/42.53 |

FOREIGN PATENT DOCUMENTS

| | | |
|---|---|---|
| 964784 | 3/1975 | Canada . |
| 1542422 | 10/1968 | France . |

OTHER PUBLICATIONS

"Furfuryl Alcohol Bonded Polymer Concrete" Technical Data Sheet, dated Aug. 15, 1979, The Quaker Oats Co.

"Mainstay Polymer Concrete (MPC)" Sales Bulletin, dated Feb. 29, 1980, Mainstay Corportation.

"Polymer Concrete Made with Furfuryl Alcohol Binder 6230" Technical Data Sheet, dated Mar. 3, 1980, The Quaker Oats Co.

Bushong, R. M. and Steele, C. J. "Furan Polymer Concrete: A Candidate Material for Industrial Corrosive Environments." A paper presented at May 8, 1980 Third International Symposium on Corrosion in the Pulp and Paper Industry.

Derwent Abstr. 32594T/21, (5-10-72), DT 2053482, "Slow Setting Acid Resistant Bldg. Mat Contg. Furfuryl Resin".

Derwent Abst. 57063Y/32, (2-11-77) SU530868, "Polymer Concrete Mix for Road Surface . . . ", (RORE).

Derwent Abst. 90665B/50, (3-30-79), SU65469, (ANDR), "Mixt. for Mfr. of Wood-Stone Articles . . . Furfuryl Alcohol".

Derwent Abst. 62996X/33, (2-4-76), SU491597, (IRTU), "Polymer Concrete . . . ".

"The Technology of Resin Concretes," Zement: Kalk: Gips, vol. 2, R. Bares, pp. 47-60 (1967).

"III. Some Reflections on the Sand Acid Demand Phenomenon" bulletin 46, 1967 Annual Meeting Ductile Iron Society D. O. William, pp. 9-12 (1967).

"The Acid Demand Value and its Place in Foundry Sand Control" Transactions of the American Foundrymen's Society, E. L. Kotzin, pp. 305-306.

"The Acid Demand Value and its place in Foundry Sand Control" American Foundrymen's Society, E. L. Kotzin, pp. 111, 112 (1968).

"Spotlight on Specialty Sands"; Foundry; pp. 40-45 (1970).

"Furan Resin Bonded Sands: Variation in Hardening Rate as a Function of Alkalinity", Fondeur D'Aujourd'Hui No. 253 M. Barnabe, pp. 26-28 (1974).

"Furan Resin Concrete and its Application to Large Diameter Sewer Pipes" International Synposium, Polymers in Concrete, pp. 41-75 (1978).

"Acid Demand Test," AFS Mold and Core Test Handbook" pp. 17-5, 17-6 (1980).

*Primary Examiner*—Wilbert J. Briggs, Sr.

[57] ABSTRACT

A polymer concrete comprising by weight about 40-70% coarse aggregate, about 20-55% of a fine aggregate such as sand, about 2-15% silica flour and about 8% to 12% furfuryl alcohol polymerized in situ with an acid catalyst produces a highly cross-linked concrete which contains no cement and is mixed with water. The furfuryl polymer concrete provides the broadest range of chemical resistance of all existing polymer concretes. The coarse and fine aggregate have a pH less than 7.0 and are provided with a specific size gradation.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-10 is confirmed.

* * * * *